United States Patent
Wang et al.

(10) Patent No.: US 10,515,192 B2
(45) Date of Patent: Dec. 24, 2019

(54) CONSISTENT SNAPSHOTS AND CLONES IN AN ASYMMETRIC VIRTUAL DISTRIBUTED FILE SYSTEM

(71) Applicant: VMware, Inc., Palo Alto, CA (US)

(72) Inventors: Wenguang Wang, Santa Clara, CA (US); Luke Lu, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 545 days.

(21) Appl. No.: 15/013,877

(22) Filed: Feb. 2, 2016

(65) Prior Publication Data
US 2017/0220777 A1    Aug. 3, 2017

(51) Int. Cl.
*G06F 21/10*    (2013.01)
*G06F 21/62*    (2013.01)
*G06F 16/11*    (2019.01)
*G06F 16/182*    (2019.01)
*G06F 16/188*    (2019.01)

(52) U.S. Cl.
CPC .......... *G06F 21/105* (2013.01); *G06F 16/128* (2019.01); *G06F 16/183* (2019.01); *G06F 16/188* (2019.01); *G06F 21/6218* (2013.01); *G06F 2221/0771* (2013.01)

(58) Field of Classification Search
CPC ............. G06F 21/105; G06F 17/30088; G06F 17/30203; G06F 17/30233; G06F 21/6218; G06F 2221/0771; G06F 16/188; G06F 16/183; G06F 16/128; G06F 2221/2137
See application file for complete search history.

(56) References Cited

U.S. PATENT DOCUMENTS 7,739,233 B1 * 6/2010 Ghemawat ........ G06F 17/30174
                                                707/610
2011/0219106 A1 * 9/2011 Wright .................. G06F 15/173
                                                709/223

OTHER PUBLICATIONS

9netics: 9p cloud technology and service. http://www.9netics.com/; 1 page, Dec. 8, 2015.
9p2000.I protocol. https://github.com/chaos/diod/blob/ master/protocol.md; 11 pages, Dec. 8, 2015.
Amazon efs. http://aws.amazon.com/efs/; 8 pages; Dec. 8, 2015.
Kit Colbert, "Cloud-Native Apps", VMware Blogs, Dec. 2, 2014, 2 pages.
Apache spark. https://spark.apache.org/; 3 pages, Dec. 8, 2015.
(Continued)

*Primary Examiner* — Linglan E Edwards
*Assistant Examiner* — Forrest L Carey

(57) ABSTRACT

Processing in an asymmetrically distributed file system may include storing first data representative of the content of the files in a file system volume among a plurality of storage nodes. Second data representative of attributes of the files in the file system volume may be stored in only one of the storage nodes. Time-limited leases allow clients direct access to the plurality of storage node in order to access portions of the file system volume. The time-limited leases may be provided to client lessors. Snapshots of the file system volume may be generated after sending a revocation to the client lessors to revoke time-limited leases provided to the client lessors and having received the acknowledgements of the revocations or after the leases have expired for non-responding lessors, to ensure that changes are not made to the file system volume during snapshot processing.

20 Claims, 7 Drawing Sheets

(56) References Cited

OTHER PUBLICATIONS

Btrfs file system. https://btrfs.wiki.kernel.org/; 8 pages, Dec. 8, 2015.
Cgroups. http://en.wikipedia.org/wiki/Cgroups; 5 pages, Dec. 8, 2015.
Docker—application container engine. https://github.com/ docker/docker; 6 pages, Dec. 8, 2015.
Epic—data retention. https://epic.org/privacy/intl/data_ retention.html; 36 pages, Dec. 8, 2015.
The hadoop filesystem api definition. http://hadoop.apache.org/docs/current/hadoop-project-dist/hadoop-common/filesystem/index.html; 1 page, Dec. 8, 2015.
Sage A. Weil, Andrew W. Leung, Scott A. Brandt, and Carlos Maltzahn. Rados: A scalable, reliable storage service petabytescale storage clusters. In Proceedings of the 2Nd International Workshop on Petascale Data Storage: Held Conjunction with Supercomputing '07, PDSW '07, 10 pages, New York, NY, USA, 2007. ACM.
Mac basics: Time machine backs up your Mac. http://support.apple.com/en-us/HT201250; 4 pages, Dec. 8, 2015.
Novm—a kvm-based vmm written in go. https://github.com/ google/novm; 4 pages, Dec. 8, 2015.
Open platform 3.0. https://collaboration.opengroup.org/ platform3/; 3 pages, Dec. 8, 2015.
Open source COW B+ tree. https://github.com/orodeh/bt; 2 pages, Dec. 8, 2015.
Virtual hadoop. http://wiki.apache.org/hadoop/Virtual% 20Hadoop; 6 pages, Dec. 8, 2015.
Jean-Philippe Aumasson and Daniel J. Bernstein. Siphash: A fast short-input prf. In Steven D. Galbraith and Mridul Nandi, editors, Indocrypt, vol. 7668 of Lecture Notes in Computer Science, pp. 489-508. Springer, 2012.
Jeff Bonwick, Matt Ahrens, Val Henson, Mark Maybee, and Mark Shellenbaum_ the zettabyte file system. In Proc. of the 2nd Usenix Conference on File and Storage Technologies, 13 pages, 2003.
Jeffrey Dean and Sanjay Ghemawat. Mapreduce: simplified data processing on large clusters. Communications of the ACM, 51(1): 14 pages, 2008.
John K Edwards, Daniel Ellard, Craig Everhart, Robert Fair, Eric Hamilton, Andy Kahn, Arkady Kanevsky, James Lentini, Ashish Prakash, Keith a Smith, et al. Flexvol: flexible, efficient file volume virtualization in waft. In USENIX 2008 Annual Technical Conference on Annual Technical Conference, pp. 129-142. USENIX Association, 2008.
Jim E Garlick. I/o forwarding on livermore computing commodity linux clusters. Technical report, Lawrence Livermore National Laboratory (LLNL), Livermore, CA, 9 pages, 2012.
Sanjay Ghemawat, Howard Gobioff, and Shun-Tak Leung. The google file system. In ACM SIGOPS Operating Systems Review, vol. 37, pp. 29-43. ACM, 2003.
Dave Hitz, James Lau, and Michael A Malcolm. File system design for an nfs file server appliance. In USENIX winter, vol. 94, 1994, 23 pages.
Haoyuan Li, Ali Ghodsi, Matei Zaharia, Scott Shenker, and Ion Stoica.Tachyon: Reliable, memory speed storage for cluster computing frameworks. In Proceedings of the ACM Symposium on Cloud Computing, pp. 1-15. Acm, 2014.
C. Mohan, Don Haderle, Bruce Lindsay, Hamid Pirahesh, and Peter Schwarz. Aries: A transaction recovery method supporting finegranularity locking and partial rollbacks using write-ahead logging. ACM Trans. Database Syst., 17 (1):94-162, Mar. 1992.
Ohad Rodeh. B-trees, shadowing, and clones. Trans. Storage, 3(4):2:1-2:27, Feb. 2008.
Frank B Schmuck and Roger L Haskin. Gpfs: A shared-disk file system for large computing clusters. In FAST, vol. 2, p. 19, 2002.
Philip Schwan. Lustre: Building a file system for 1000-node clusters. In Proceedings of the 2003 Linux Symposium, vol. 2003, 2003, 9 pages.
Konstantin Shvachko, Hairong Kuang, Sanjay Radia, and Robert Chansler. The hadoop distributed file system. In Mass Storage Systems and Technologies (MSST), 2010 IEEE 26th Symposium on, pp. 1-10. IEEE, 2010.
Sage A Weil, Scott A Brandt, Ethan L Miller, Darrell De Long, and Carlos Maltzahn. Ceph: A scalable, high-performance distributed file system. In Proceedings of the 7th symposium on Operating systems design and Implementation, pp. 307-320. USENIX Association, 2006.

* cited by examiner

CONSISTENT SNAPSHOTS AND CLONES IN AN ASYMMETRIC VIRTUAL DISTRIBUTED FILE SYSTEM

BACKGROUND

The benefits of cloud computing and the development/operations (DevOps) approach to software development are giving rise to a new generation of cloud-native applications. These applications have unprecedented requirements for scalable and agile storage and data management services. In some configurations, for example, an environment may require the rapid deployment of tens of thousands of application instances that need to perform concerted data processing while ensuring security and performance isolation between tenants and workloads. Emerging application deployment platforms, often based on the concept of "containers," assume Unix-like operating environments and file systems as the main storage abstraction. However, there are few scalable and robust storage solutions for these use cases, beyond the proprietary services developed by public cloud vendors such as Amazon, Inc. and Google, Inc.

SUMMARY

In accordance with some aspects of the present disclosure, a method in a file system may include storing first data representative of the content of files in a file system volume. The first data may be stored among a plurality of storage nodes of a distributed storage system. Second data representative of attributes of the files in the file system volume may be stored in only one of the storage nodes. Time-limited leases may allow clients direct access to the plurality of storage nodes in order to access portions of the file system volume. The time-limited leases may be provided to client lessors. A snapshot of the file system volume may be desired. Producing a snapshot may include sending a revocation to the client lessors to revoke time-limited leases provided to the client lessors and then generating the snapshot after the client lessors have acknowledged the revocations, or after the leases have expired for non-responding lessors.

In accordance with some aspects of the present disclosure, a non-transitory computer-readable storage medium may include computer-executable instructions for controlling a computer system comprising a plurality of host computers to store first data representative of the content of files in a file system volume among a plurality of storage nodes of a distributed storage system. The computer system may store second data representative of attributes of the files in the file system volume in only one of the storage nodes. The computer system may manage time-limited leases that allow clients direct access to the plurality of storage nodes in order to access portions of the file system volume, including providing time-limited leases to client lessors. If a snapshot is desired, the computer system may generate a snapshot of the file system volume, including sending a revocation to the client lessors to revoke time-limited leases provided to the client lessors and generating the snapshot after the client lessors have acknowledged the revocations, or after the leases have expired for non-responding lessors.

In accordance with some aspects of the present disclosure, a system may include a plurality of host computers and a distributed storage system. The system may include computer-readable storage media comprising instructions for controlling various host computers in the plurality of host computers to store first data, representative of the content of files in a file system volume, among a plurality of storage nodes of the distributed storage system. Second data representative of attributes of the files in the file system volume may be stored in only one of the storage nodes. The system may manage time-limited leases that allow clients direct access to the plurality of storage nodes in order to access portions of the file system volume, including providing time-limited leases to client lessors. Each client lessor may be permitted to directly access the plurality of storage nodes so long as the client lessor's time-limited lease has not expired. The system may generate a snapshot of the file system volume, including sending a revocation to the client lessors to revoke time-limited leases provided to the client lessors and generating the snapshot after the client lessors have acknowledged the revocations, or after the leases have expired for non-responding lessors.

The following detailed description and accompanying drawings provide a more detailed understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
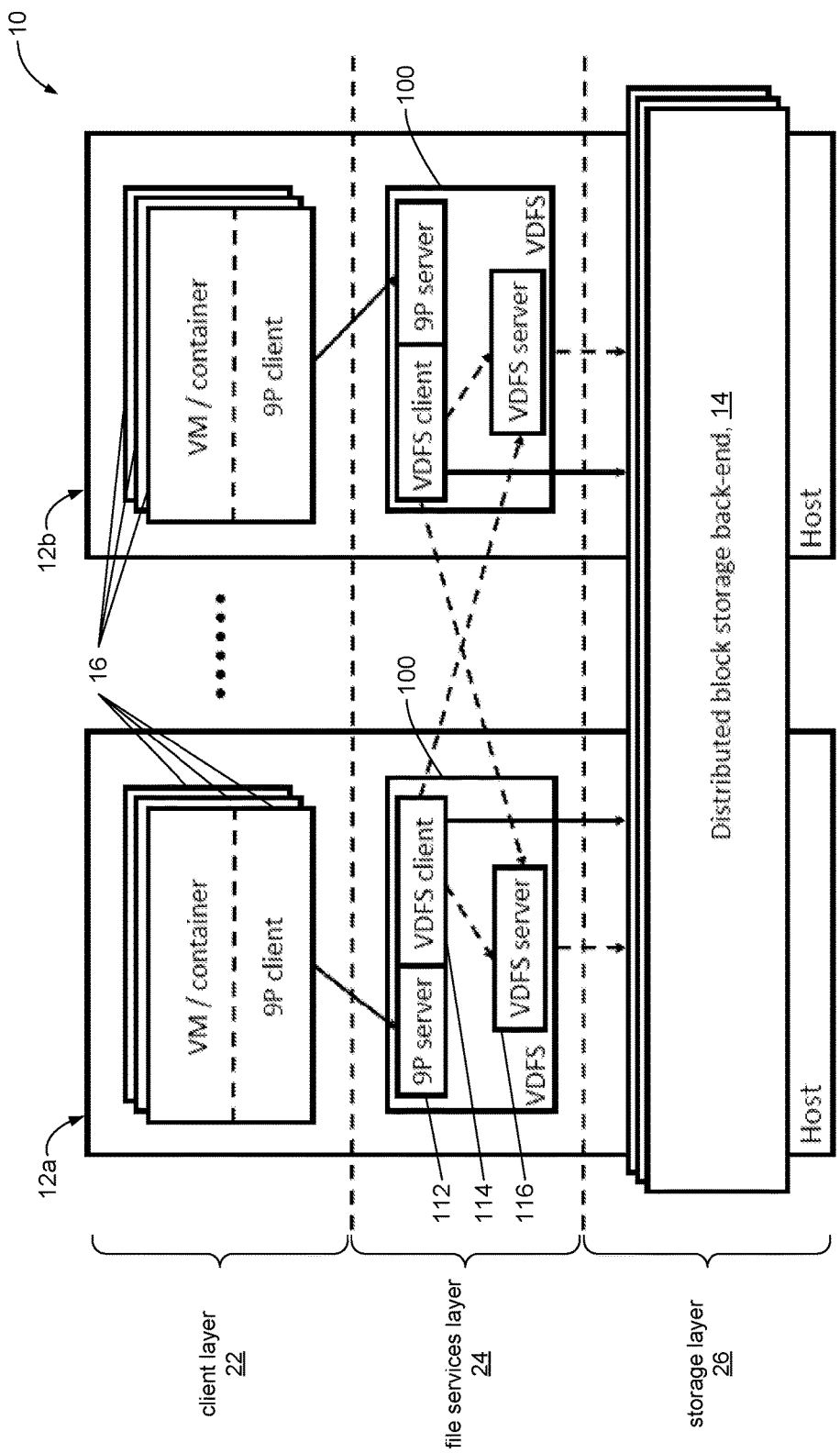
FIG. 1 shows a system level diagram of a computing environment that includes a virtual distributed file system (VDFS) in accordance with the present disclosure.

FIG. 1 shows a computing environment 10 that may incorporate an illustrative embodiment of a virtual distributed file system (VDFS) 100 in accordance with the present disclosure. The VDFS 100 may comprise several components, including data (may be referred to as VDFS metadata) that describe aspects of the VDFS 100. The VDFS metadata may include metadata that identifies and describes aspects/ properties of the actual data files that are organized by the VDFS 100; e.g., file name, file size, creation date, etc. The VDFS metadata may include metadata that identifies and describes aspects of the data blocks that contain the constituent data in the data files; sized o the data blocks, location, etc. The VDFS metadata may include metadata that describe aspects and properties of the directory structure of the VDFS 100 (e.g., directory name, creation data, access control, etc.), and so on.

In accordance with the present disclosure, the computing environment 10 may comprise several host machines 12*a*, 12*b* (hosts) and a distributed storage backend 14. Although the figure shows two hosts 12*a*, 12*b*, it will be understood that other embodiments may comprise any number of hosts, sometimes referred to as a cluster. The hosts 12*a*, 12*b* may access the distributed storage backend 14 over a suitable communication network (not shown).

The VDFS 100 may run in many types of large-scale cloud environments. In some embodiments, for example, hosts 12*a*, 12*b* may run a hypervisor to support virtual machines (VMs). In a particular implementation, for example, the hosts 12*a*, 12*b* may constitute a cluster of VMware® ESXi™ hypervisors. In other embodiments, the hosts 12*a*, 12*b* may run native OS's to support containers. A "container" may be loosely viewed as a lightweight VM. Containers, for example, may be used to support efficient application deployments in a large installation. Containers do not necessarily boot from virtual block devices and they are not necessarily concerned with hardware emulation. A container can be quickly started using a warm buffer cache, and can also be terminated quickly without having to perform lengthy file system checks (e.g., fsck), and without the risk of data loss, or worse, file system corruptions, which can result from unclean shutdowns of VMs.

As illustrated in FIG. 1, the computing environment 10 may be logically partitioned into a client layer 22, a file services layer 24, and a storage layer 26. In some embodiments, the layers 22, 24, 26 may reside in a single host (e.g., 12*a*). In other embodiments, the client layer 22 may be hosted in one host machine (e.g., 42*a*, FIG. 4) and the filer services layer 24 may be hosted in another host machine (e.g., 402*a*, FIG. 4). The storage layer 26 may be distributed across multiple host machines 12*a*, 12*b*.

The client layer 22 may comprise software machines 16 instantiated in hosts 12*a*, 12*b* to support users in the computing environment 10 who need access to the VDFS 100. As used herein, the term "software machine" will be understood to refer to virtual machines (VMs), containers, and the like. Each software machine 16 may include a file system interface to access files in the VDFS 100. In some embodiments, for example, the file system interface in some of the software machines 16 may be a 9P client that uses the Plan 9 file protocol (9P) as the front-end file service protocol to make requests to the VDFS 100. In other embodiments, the file system interface may use any other suitable file service protocols.

The file services layer 24 may provide file services to access VDFS 100 in order to support the file usage needs of users in the computing environment 10. Following are some file system use cases that may be supported by a VDFS in accordance with the present disclosure.

Use Cases in Cloud Native Applications

Location-Independent Container/VM Storage.

A VDFS in accordance with the present disclosure can support efficient implementation of images for VMs, containers, and other software machines. Such images can be accessed from any host in a cluster, thus facilitating automated distributed resource scheduling. Multi-writer sharable VDFS volumes can provide a simple and scalable mechanism to share configurations, code, and application states among multiple VMs or containers.

Data-Driven Applications.

A VDFS in accordance with the present disclosure can provide simple and scalable virtual file systems for data-driven applications in the cloud. The efficient and scalable snapshot capability of the VDFS can make it an ideal back-end for high-performance in-memory file systems, for real-time parallel data processing, and for batch processing of big data. In the context of the present disclosure, a snapshot generally refers to a copy of the virtual machine's disk file (VMDK) at a given point in time. Snapshots provide a change log for the virtual disk and can be used to restore a VM to a particular point in time when a failure or system error occurs.

New Agile Workflows.

Using a VDFS in accordance with the present disclosure, developers no longer need to provision block storage having sizes that are awkward to resize or share among containers or VMs. The size of a VDFS volume can grow or shrink automatically, as users add or remove files and directories. Scalable snapshots and clones can enable new development, testing, and deployment workflows that were previously difficult, if not impossible, to implement efficiently. For example, multiple clones of a production volume can be created for development/test purposes while ensuring performance and security isolation.

Use Cases in Enterprise Big Data Environments

Scalable and High-Performance Data Processing.

The distributed file system (DFS) configuration is a common configuration for big data and high performance cluster (HPC) workloads in physical data centers. Data throughput in a VDFS in accordance with the present disclosure can scale linearly as more data processing nodes are added. VDFS metadata throughput can scale linearly as more file system volumes are created (e.g., using the standard Unix utility mkdir), which is much simpler than adding new federated name nodes or metadata servers.

Scalable Data Protection Mechanisms.

Existing DFS and scale-out network attached storage (NAS) solutions may lack scalable snapshot and clone capabilities. A VDFS in accordance with the present disclosure can provide snapshots and clones that facilitate a range of data protection solutions at unprecedented scale; e.g., provide millions of point-in-time snapshots of a file system volume at a fine time granularity.

Classic File System Namespace

Nas Functionality.

A VDFS in accordance with the present disclosure can provide conventional NAS solutions without some of the management challenges associated with NAS scalability. The VDFS can host home directories and content without scalability limits as the number of users grows, or the file system volume of content grows.

Vm Storage.

A VDFS in accordance with the present disclosure can provide a virtual file system for traditional VM storage. As will be described below, the VDFS can provide efficient native snapshot and clone capabilities to facilitate use cases such as environments with very large numbers of "thin clone" VMs.

Virtual Desktop Infrastructure (VDI).

Beyond thin clones of virtual desktop images, a VDFS in accordance with the present disclosure can serve other VDI requirements. For example, with appropriate client drivers, the VDFS may support shared application file system volumes and user home directories and folders.

Continuing with the file services layer 24 shown in FIG. 1, in some embodiments, software and data components that comprise the VDFS 100 may be provided in each of host 12a, 12b in the computing environment 10. The VDFS 100 may include a file server 112 that executes in each host (e.g., 12a) to provide file services for the software machines 16 executing in that host; e.g., via the 9P client in each of those software machines 16. In a particular implementation, for example, the file server 112 may be a 9P server to provide file services using the 9P file protocol. As noted above, in some embodiments, a single host (e.g., 12a) may run the client layer 22 and the file services layer 24. In other embodiments, the client layer 22 and the file services layer 24 may run in different hosts; see, for example, the configuration in FIG. 4.

File services in the VDFS 100 may include creating and deleting directories, creating and deleting files, reading and writing files, reading and writing file attributes, and other file services. The VDFS 100 may include a VDFS client 114 that executes in each host (e.g., 12a) to handle file service requests it receives from the file server 112 (e.g., 9P server) executing in that host. In some embodiments, the VDFS client 114 may run in the kernel of the host; e.g., in order to improve response times. The VDFS 100 may include a VDFS server 116 that executes in each host (e.g., 12a) to service requests made on the VDFS 100. These aspects of the present disclosure will be discussed in more detail below.

The computing environment 10 may include a storage layer 26. In some embodiments, the VDFS 100 may be designed to run on top of a distributed block storage 14, and in particular a distributed block object store. Files in the VDFS 100 may comprise one or more blocks allocated from the distributed block storage 14. In some embodiments, for example, the underlying block object store may support scalable data paths, fault tolerance, and configurable reliability and availability per block object. In a particular implementation, for example, the distributed block storage 14 may be based on a VMware® VSAN™ storage system. In general, any suitable distributed storage system may be used in the distributed block storage 14 component of the computing environment 10.

Figure 2:
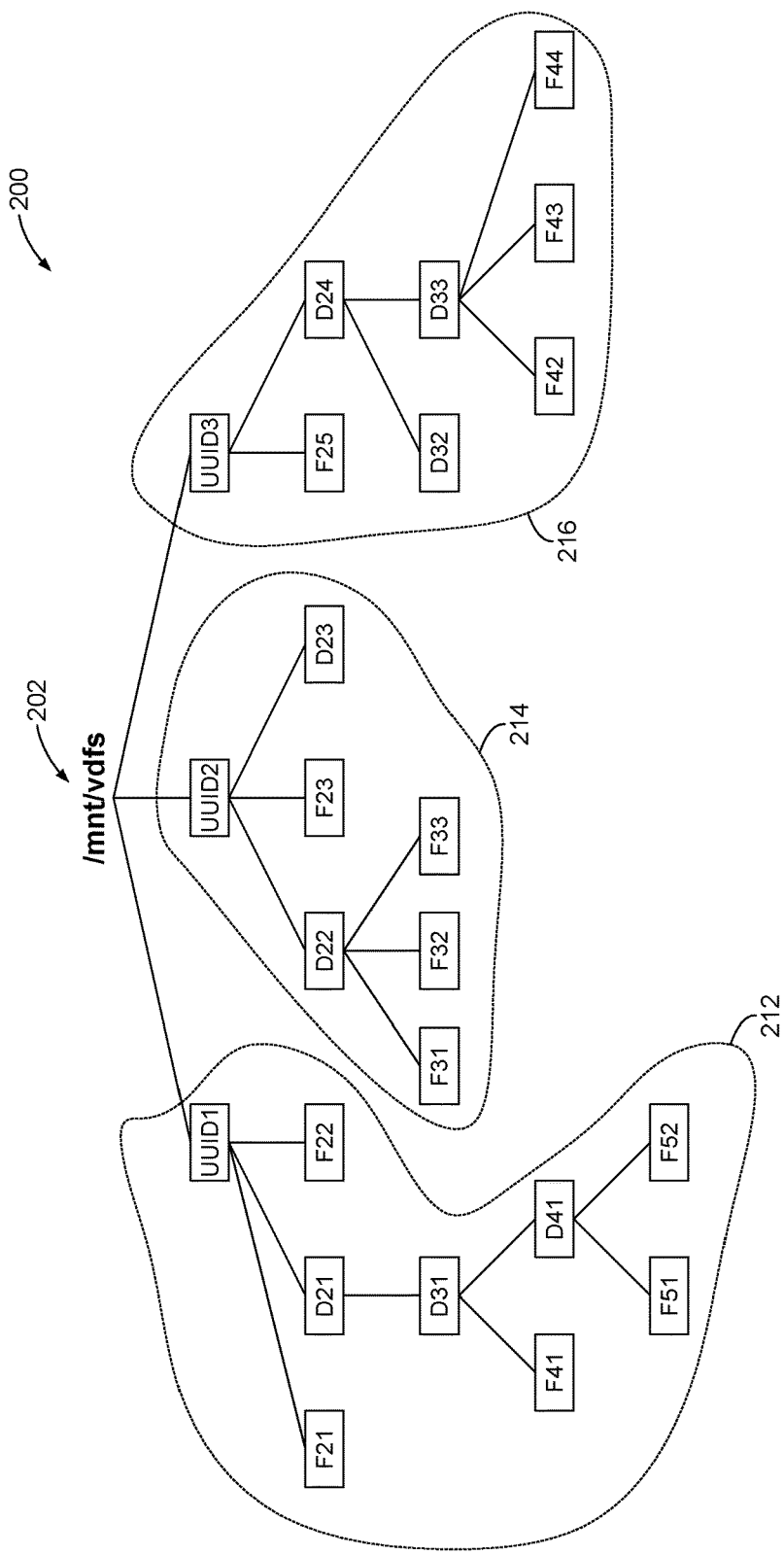
FIG. 2 shows a logical view of a VDFS.

FIG. 2 shows a logical view of an illustrative example of a VDFS 200 in accordance with the present disclosure. Users may see VDFS 200 mounted on a mount point 202 like any other local file system. In accordance with the present disclosure, a VDFS may be organized as a plurality of file system volumes. In the illustrative example shown in FIG. 2, for instance, VDFS 200 comprises three file system volumes 212, 214, 216. Each file system volume 212, 214, 216 may comprise a directory structure of sub-directories (e.g., D21, D22, etc.) and files (e.g., F21, F23, etc.).

A "file system volume" may be viewed as a subset of the namespace (e.g., directory names, file names, etc.) of a VDFS in accordance with the present disclosure. In some embodiments, a VDFS may have up to $2^{64}$ file system volumes. Usually each file system volume occupies a mount point in the kernel of an operation system. However, operating systems are not designed to handle too many mount points because mount points are often stored in memory. Accordingly in some embodiments, a VDFS in accordance with the present disclosure may use synthetic path names for file system volumes so that no extra mount points are needed besides a default mount point; e.g., /mnt/vdfs. In some embodiments, a file system volume may be associated with a universally unique identifier (UUID) and can always be accessed from /mnt/vdfs/<UUID>. FIG. 2, for example, shows file system volumes 212, 214, 216 having respective UUIDs UUID1, UUID2, UUID3. Besides the real path name of each file system volume (e.g., /mnt/vdfs/UUID1), symbolic links can be used to access file system volumes 212, 214, 216 using more meaningful path names.

Figure 3:
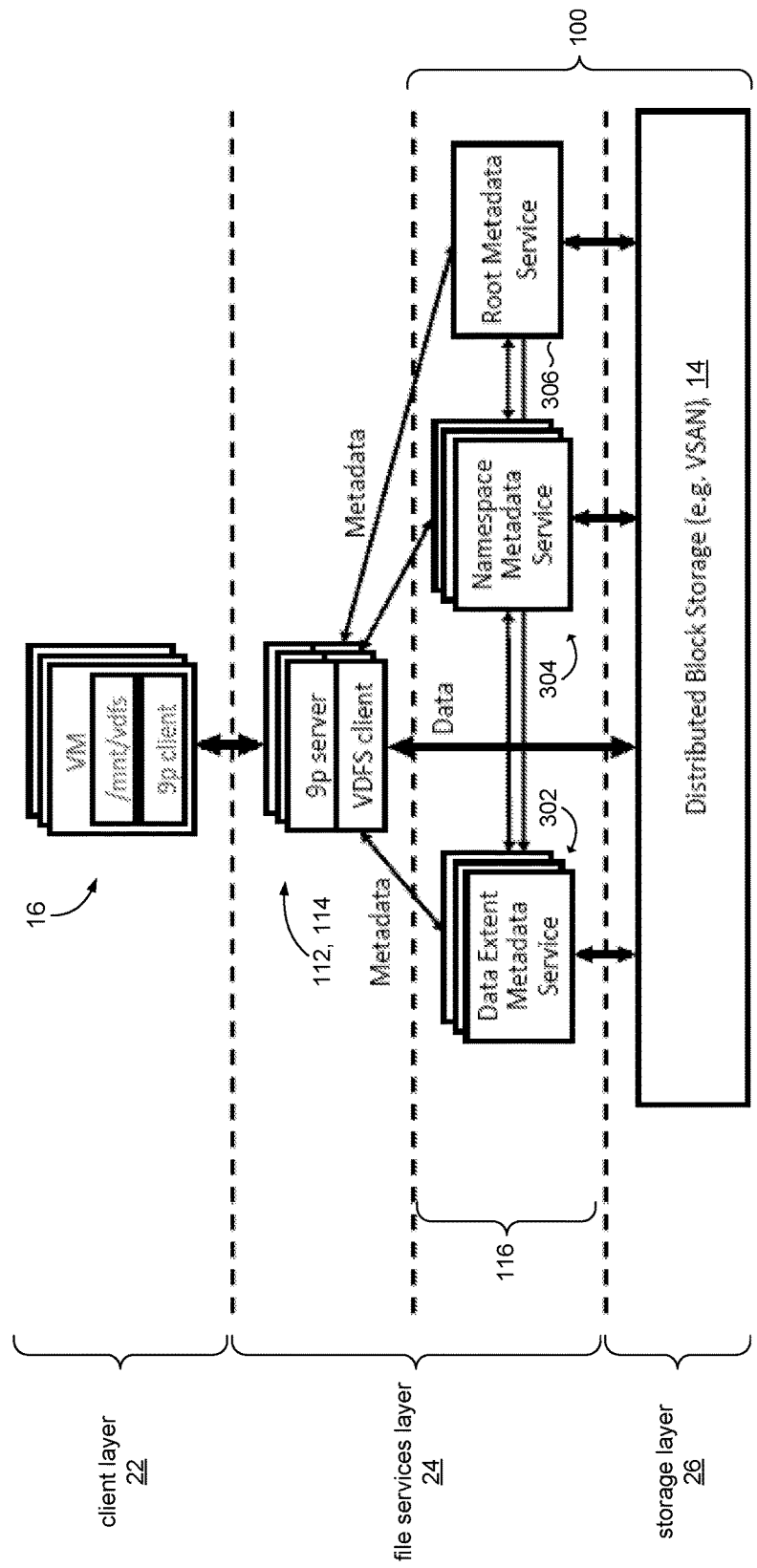
FIG. 3 shows some file services of the VDFS in accordance with the present disclosure.

FIG. 3 shows some file services 302, 304, 306 provided by the file services layer 24 in accordance with the present disclosure. In some embodiments, for example, each VDFS server 116 may manage the metadata for a given file system volume in the VDFS 100. In some embodiments, for example, each VDFS server 116 may execute an instance of a data extent metadata service 302 and a namespace metadata service 304 for a given file system volume in the VDFS 100. In accordance with the present disclosure, a single VDFS server 116 in a given host (e.g., 12a, FIG. 1) may instantiate a data extent metadata service 302 and a namespace metadata service 304 to manage the metadata for a given file system volume in the VDFS 100. Referring to FIG. 2, for example, a VDFS server 116 (e.g., in host 12a) may instantiate a data extent metadata service 302 and a namespace metadata service 304 to manage the metadata for the file system volume identified by UUID1. Another VDFS server 116 (e.g., in host 12b) may instantiate a data extent metadata service 302 and a namespace metadata service 304 to manage the metadata for the file system volume identified by UUID2, and so on.

The metadata managed by a data extent metadata service 302 associated with a given file system volume may include data that identifies the allocation state of each data block in the distributed block storage 14 that is associated with the given file system volume; e.g., whether the data block is free or allocated. In some embodiments, more than one file may point to a given data block. For example, in a file system volume that supports data deduplication, a block of data that is common to two or more files in the given file system volume may be stored in a single data block. The metadata managed by the data extent metadata service 302 associated with the given file system volume may include a counter (e.g., a reference count) for each data block that indicates how many files point to that data block. The reference count may be incremented or decremented as the number of files that point to a given data block changes.

The metadata managed by a namespace metadata service 304 associated with a given file system volume may include data for each file in that file system volume. For example, the metadata may include the file names of files in that file system volume. The metadata may include information about file attributes such as creation dates, modification dates, access control information (e.g., read, write, read-only, etc.), ownership, extended attributes, and so on. The metadata may include information about file system directories, such as directory names and attributes such as directory creation dates, directory modification dates, directory access control information (e.g., read, write, read-only, etc), directory ownership, directory extended attributes and so on. The metadata may include extra information about file system hierarchy metadata, such as hard links and symbolic links.

For operations that read or write to the namespace metadata (so-called metadata operations), such as readdir, mkdir, falloc, etc., the VDFS client 114 may forward such metadata operations to the namespace metadata service of the VDFS server 116 that corresponds to the file system volume in which the operations (e.g., mkdir, create) are performed. However, in accordance with the present disclosure, the VDFS client 114 may directly access data blocks in the distributed block storage 14 to make changes to the data in a given file; e.g., read/write data of the file. In some embodiments, for example, the VDFS client 114 may cache metadata from the data extent service 302 corresponding to the file system volume that the given file resides in.

Figure 4:
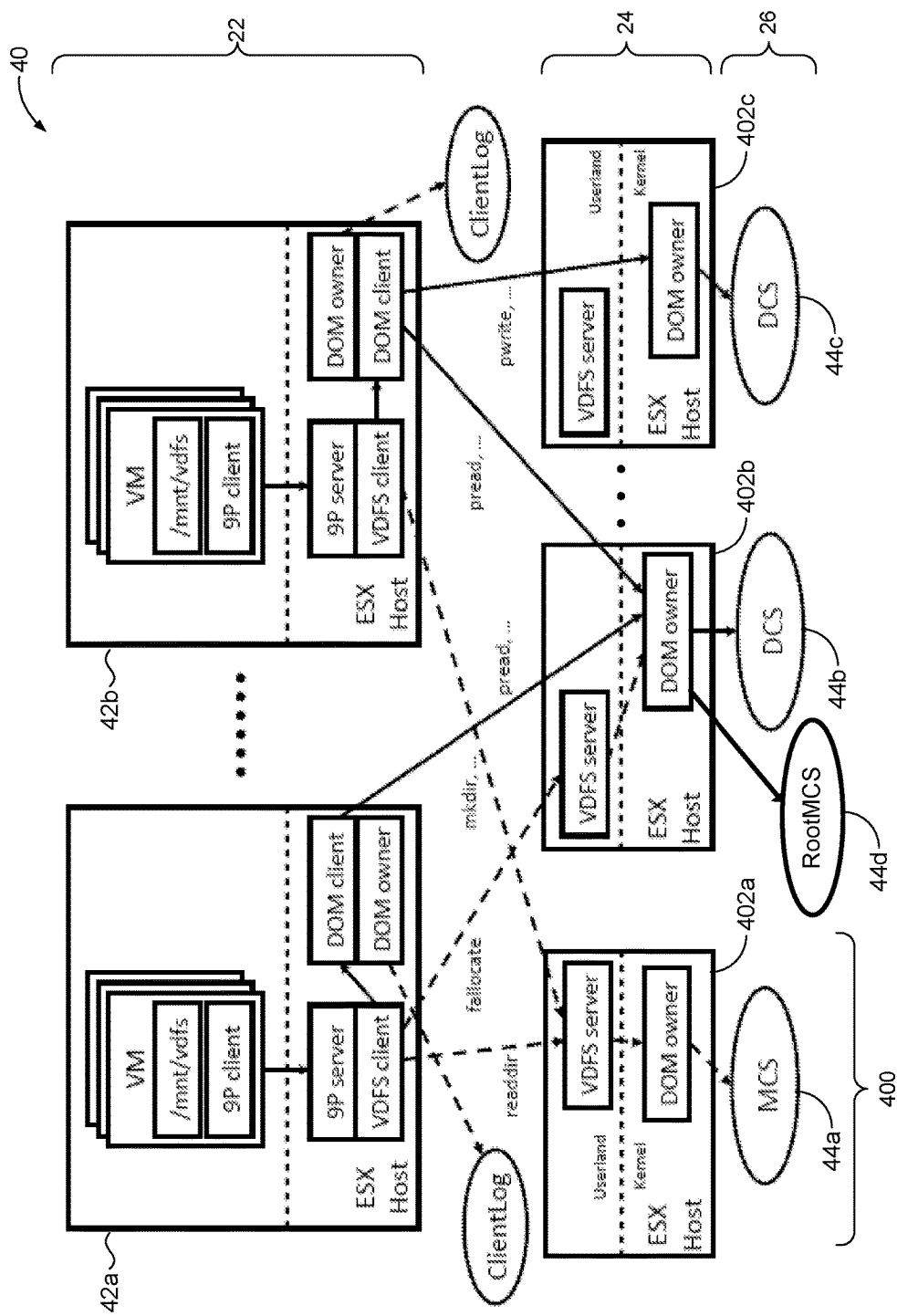
FIG. 4 shows an embodiment in accordance with the present disclosure.

FIG. 4 illustrates an example of a particular implementation of a computing environment 40 comprising a system of virtual machines, also referred to as hosts 42a, 42b. In the particular implementation shown in FIG. 4 the hosts may be based on VMware® ESX™ host machines, and the client layer 22 executes in hosts 42a, 42b. The storage layer may be any suitable distributed block storage system. In the particular implementation shown in FIG. 4, for example, the storage system may be based on a VSAN™ storage architecture. The file services layer 24 executes in separate hosts 402a, 402b, 402c. The storage layer 26 comprises separate VSAN™ storage systems 44a, 44b, 44c, 44d accessed by respective hosts 402a, 402b, 402c.

Access to data blocks on the storage systems 44a, 44b, 44c, 44d occurs via servers referred to as document object module (DOM) owners. Thus, a VDFS server on a host (e.g., 402a) may access its storage system 44a via a DOM owner executing on that host 402a. A VDFS client on a host (e.g., 42a), likewise, may directly access data blocks on the storage systems 44a, 44b, 44c, 44d via a DOM client and DOM owner executing on that host 42a. The DOM client in a host 42a, 42b may communicate with a DOM owner executing on any host 402a, 402b, 402c to directly access data blocks in respective storage systems 44a, 44b, 44c, 44d. The discussion will now turn to some details of the storage systems 44a, 44b, 44c, 44d.

A VDFS in accordance with the present disclosure may use any suitable distributed block storage system. Different distributed block storage back-ends, however, have different properties, such as maximum size of block object, whether a block object can grow, etc. In order for a VDFS in accordance with the present disclosure to be independent of the specifics of a particular object store, a Generic Chunk Store (GCS) may be abstracted that unifies any distributed block storage architecture into a generic block storage architecture. In addition to abstracting away the differences of different block storage back-ends, the GCS may provide additional features such as:

Multiple address space. Each GCS can provide access to multiple block objects, each with its own linear address space up to $2^{64}$ blocks.

Free space management. GCS supports an interface to allocate and de-allocate (free) blocks in objects of GCS.

Reference counts. References counts of blocks in GCS objects can be maintained. This can be a useful to support scalable snapshots and clones.

Transactions. Objects in GCS can be updated in atomic transactions using a physical log.

Load balancing. GCS can abstract multiple block objects in the underlying storage into one GCS object. This allows scalable performance of GCS regardless the design of the underlying back-end.

Figure 5:
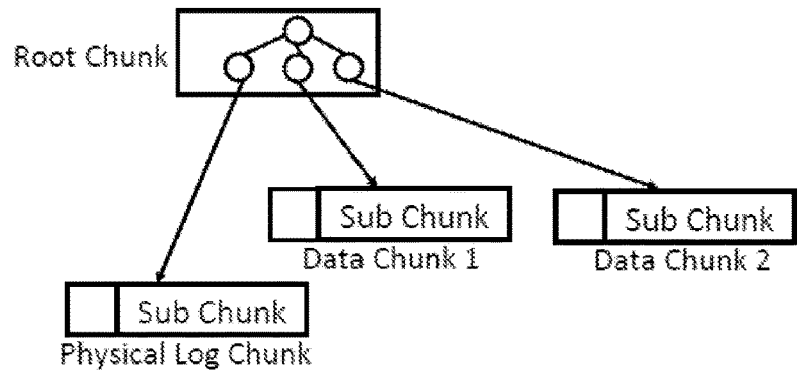
FIGS. 5, 6, and 7 illustrate some data structures in accordance with the present disclosure.
Figure 6:
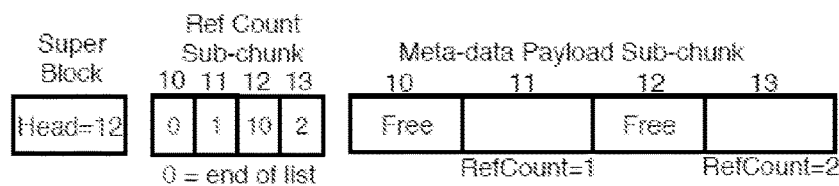

In some embodiments, the GCS may be built on top of a tree of objects, starting with a fixed size root chunk, as shown in FIG. 5 for example. Each chunk may have a set of sub-chunks, such as header block, bitmap, physical log, reference count, metadata, actual file data, etc. The root chunk has a metadata subchunk which contains a B-tree of other chunks, such as metadata chunk, data chunk, physical log chunk, etc. If each type of the chunk is full, a new chunk can be added, and its data may be concatenated with the previous chunk of the same type, referred to as a ConcatC-hunk. FIG. 6 shows that a data ConcatChunk may consist of two chunks. GCS allows very large ConcatChunks to be created, even on block object stores with small maximum size.

In some embodiments, the GCS may support atomic updates to blocks in the GCS using the physical log chunk. Operations to the GCS may first be recorded in a logical log of the GCS, and then in an in-memory write-back buffer cache. The physical log may be used to flush all dirty pages in the cache to disk atomically by first writing dirty pages to the log, and then to their original location. A VDFS may manage three different types of GCS: multiple Data Chunk Stores (DCSs), multiple Metadata Chunk Stores (MCSs), and one Root Metadata Chunk Store (RootMCS). A DCS manages file data. An MCS manages metadata of a file system volume (directories, file names, etc.), and the Root-MCS manages metadata of the VDFS (access control, quota, etc.). Each VDFS client may create a ClientLog (FIG. 4) to record logical operations that are local to the client, such as space allocation and de-allocation requests for file data.

An MCS (e.g., 44a, FIG. 4) may store information for a given file system volume in the VDFS. In accordance with the present disclosure, an MCS may be associated with a given host (e.g., 402a) and accessible only via that host; e.g., via a VDFS daemon process vdfsd executing in that host. Different MCSs for different file system volumes may be stored in different hosts (e.g., 402a, 402b), to allow for better scalability. An MCS may store a collection of VDFS volume information for a given file system volume in the VDFS, including their snapshot information, file system hierarchy of each snapshot, and file mapping information. The MCS may store most of its information into a ConcatChunk called Metadata Payload ConcatChunk. A copy-on-write (COW) B-tree (described below) may reside in the Metadata Payload ConcatChunk. In order to support copy-on-write capability, a refcount (reference counter) of each B-tree node may be maintained. Each chunk that has a Metadata Payload Sub-chunk also has a Refcount Sub-chunk as shown in FIG. 6, for example. For each metadata block that stores a B-tree node (configurable, but is 8 KB by default), an 8-byte refcount entry is reserved. If the metadata block is allocated, its refcount is stored in the refcount entry. Otherwise, the refcount entry forms a singly linked list of free metadata blocks. This structure allows O(1) time allocation and de-allocation of metadata blocks regardless of the total number of metadata blocks.

A DCS (e.g., 44b, 44c, FIG. 4) stores file data information (i.e., the actual data in the files themselves), along with a refcount B-tree that manages the refcount of the file data, and also the free space management of data. In accordance with the present disclosure, the file data may be stored across all the DCSs 44b, 44c in the computing environment (e.g., 40). In some embodiments, VDFS may support native volume snapshots and clones, and file clones. Accordingly, one physical data block may be referenced by multiple logical locations, the refcount B-tree may record each physical extent using the schema below:

Physical Block Number→(Number of Blocks, Refcount)

A DCS may have a Metadata Payload ConcatChunk to store the refcount tree, and a Data Payload ConcatChunk to store the file data. The free space in the file data may be managed by bitmaps and bitmap summaries. Each chunk which has a Data Payload Sub-chunk also has a Bitmap Sub-chunk. One bit in the bitmap sub-chunk reflects the allocation state of a 4 KB block in the data area. Therefore, a 2 GB bitmap can manage 64 TB of data. To avoid the CPU and I/O overhead of scanning such a large bitmap for every allocation, some embodiments may utilize a coarse bitmap summary structure. Each record in the coarse bitmap summary may be 8 bytes and describes the total number of free space and the longest contiguous free area in an 8 KB bitmap block. Only the summary needs to be scanned to find the right bitmap block for space allocation. The size of the bitmap summary for a 2 GB bitmap is 2 MB, whose full copy can be maintained in memory.

An in-memory write-back cache may be used to speed up the access to bitmap and bitmap summary pages. The consistency of the on-disk bitmap and summary is ensured by the Logical Log ConcatChunk and a Physical Log ConcatChunk. Allocation operations may be reflected in memory, and later batched and written in the logical log before allocation operations complete successfully. The physical log may be used to batch-commit the dirty in-memory data generated by logical log operations.

A RootMCS (e.g., 44d, FIG. 4) identifies the point to bootstrap VDFS. Its UUID is published in the cluster (e.g., hosts 402a, 402b, 402c) so that any client can find the host (and hence, the vdfsd) that manages the RootMCS. RootMCS stores all administrative information to bootstrap and manage a VDFS cluster. A B-tree may be used to store the information. For example, the RootMCS may store the UUIDs of all MCSs and DCSs, a volume lookup tree which maps volume UUID to MCS UUID (e.g., to access metadata for that file system volume), quota information, access control information, etc.

A VDFS in accordance with some embodiments of the present disclosure may support write back caching with write-ahead logging. Storage systems often use on-disk data structures, e.g., B-tree, to manage user data. When on-disk data structures are bigger than memory, an in-memory buffer cache is a common technique to speed up accesses to the on-disk data structures. The buffer cache maintains a lookup table to quickly search whether the asked data is in memory, and a replacement algorithm, such as Least Recently Used (LRU), to decide what data should be evicted out of memory when the buffer cache is full.

A write back cache is a type of in-memory buffer cache which can hold dirty data. With a write back cache, the client of the cache can get the buffer and modify its data. Dirty data can stay in memory for a long time before it is flushed to disk later. Combined with Write-Ahead Logging, crash safety can be achieved.

Write-Ahead Logging (WAL) may be used to provide atomic and durable update to on-disk structures. In a system using WAL, all modifications to the on-disk structures are first written to the log before they are made to their original locations. Both undo and redo information can be recorded in WAL. There is redo-undo WAL and redo-only WAL. Redo-only WAL only records the new update needs to be done for the on-disk structures, and in some embodiments is the algorithm used by VDFS. Redo-only WAL works by writing the data out twice: (1) all updates are written to the log, and flush to disk; (2) all updates are written to the original location; (3) clear log entries. If a system crashed in the middle of the process, the system will read the log entries and replay the updates to the original location.

Depending on what is recorded in the log, there may be physical logs and logical logs. A physical log records the new version of the on-disk structure in the log before writing it out to the original location. A logical log records the logical operation, such as rename ("a", "b"), in the log. A physical log is simple to implement because it is idempotent, but it has to write every data twice. A logical log is more efficient due to its small log size. However, it is not idempotent; so the log replay may need to be combined together with the physical log. A logical log records the logical operation in the log, and modifies on-disk data in the write-back cache without flushing. After there are enough dirty pages in the cache, the physical log may be used to flush all dirty pages out in an atomic way.

A logical log write is usually in the request path so it may need to be flushed to disk before the request can be acknowledged. Because each logical log entry is small (usually a few dozen bytes), and the smallest unit to write to disk is usually 512 bytes or 4 KB for SSD, byte-addressable NVRAIVI can be used to significantly reduce latency and help SSD wear when used to store logical log.

Both logical logs and physical logs may be used in a VDFS in accordance with the present disclosure, where a logical log is used in the request path and a physical log is used to batch-commit logical log operations. By recording requests first in a logical log, the requests are safe from system crash. As additional requests are received, more data in the buffer cache become dirty. After enough requests are accumulated, one big physical log transaction may be started to flush all physical pages out to their final location. Because the requests have already been heavily batched by the time of physical log transaction starts, the extra write caused by physical log is amortized across many logical requests. Another optimization that VDFS may use is to compress all log writes, which can further reduce the I/Os spent on log writing.

A VDFS in accordance with some embodiments of the present disclosure may support copy-on-write processing, using a data structure known as a Copy-On-Write (COW) B+ tree (referred to herein as COW B-tree). A COW B-tree is an efficient on-disk structure which can store key-value pairs efficiently in a sorted order. Unlike traditional B-trees commonly seen in database systems, a COW B-tree in accordance with the present disclosure may have the following characteristics:

High concurrency. The lock order for readers and writers are always top-down which allows highly concurrent tree access.

No leaf chaining. Leaf nodes of the tree are not chained together, which allows COW of the tree.

Efficient clone via COW. The whole B-tree can be cloned with O(1) time and O(1) space.

When looking up tuples in a COW B-tree, the lock order is top down, starting from the root node, and finally reaching the index node. However, when inserting tuples in traditional B-tree, if the leaf node is full, the leaf node must be split, which requires to add a new record in its parent node. The parent node may also be full and needs to split. In the worst case, node split can propagate all the way up to the root node. This bottom-up split process requires a bottom up lock order, which is contrary to the top-down locking order for lookups. Similarly, deletion can cause nodes to merge, or rebalance to propagate bottom-up to the root. As a result, systems using a conventional B-tree often lock the whole tree exclusively for writers, which limits throughput significantly.

By comparison, the COW B-tree in accordance with the present disclosure can achieve top-down lock order for all operations by using slightly more space in the COW B-tree nodes. Proactive node split, merge, or rebalance can be performed while traversing down the tree. For example, when inserting a new tuple, a lookup is performed to find the leaf node that needs to do the insert. During the lookup, if the root node or an index node being accessed is full, the node can be split immediately. This allows the child of this node to split without propagating more node splits upward.

In order to support a COW B-tree clone, a separate data structure is used to keep track of the reference count of each COW B-tree node. A COW B-tree can be cloned by copying the root node and increasing the reference counts (refcounts) of every node pointed to by the root node. Updating a cloned tree may require copy on write on all nodes on the path accessed by the update.

Figure 7:
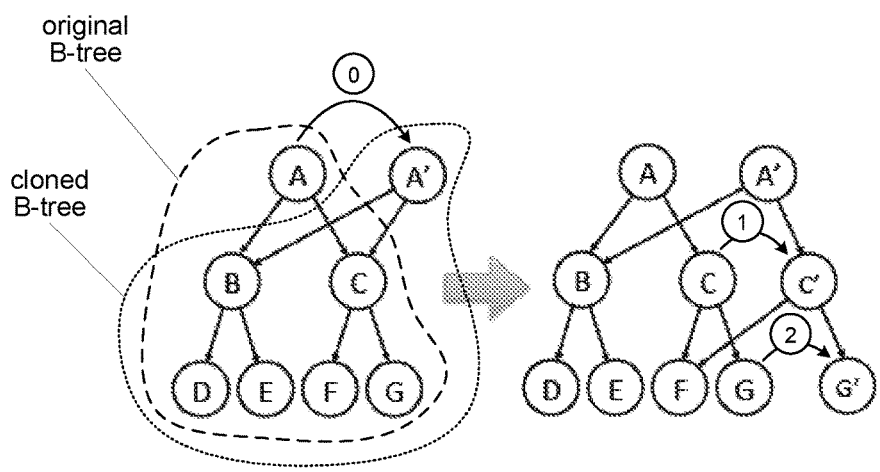

FIG. 7 illustrates an example of how COW may be performed on a cloned COW B-tree that represents a file system volume. As an initial matter (step 0), suppose the tree is first cloned by copying the root node A to A', and that the refcount of nodes B and C are incremented by 1 (to indicate that nodes A and A') point to nodes B and C. The tree that is rooted at node A may represent the original file system volume. The tree that is rooted at node A' may represent a clone of the file system volume.

Copy on write may occur, for example, if node G needs to be updated (e.g., written). Thus, for example, node C is copied to C' (step 1) and the refcount of F is increased by 1 to reflect that an additional node, namely C', is now referencing node F. Node G is copied to G' (step 2, this is the "copy" part of copy-on-write) and node C' points to node G'. Node G is then updated (this is the "write" part of copy-on-write). A property of the COW B-tree is that after a clone, each B-tree is a first class citizen. Both the original and the cloned tree can be updated without limitations. This makes the implementation of "true clones" possible.

A VDFS in accordance with the present disclosure may use the same on-disk structure to represent snapshots and clones. If a snapshot is mounted as read-write, it becomes a clone. This means that the snapshot is not a "true" snapshot because it can be modified. In some embodiments, the ability to modify a snapshot may be a desired feature. For example, some backup solutions support the feature "delete all copies of this file." If a large file is accidentally included in a snapshot, this feature also allows for the deletion of this file to get back storage space. Another use case of writable snapshots is to comply with various data retention policies which enforce a maximum retention period. Writable snapshots allow certain data in snapshots that have reached the required retention period to be easily deleted.

In some embodiments, the snapshot of a file system volume can be accessed by a hidden synthetic directory; e.g., ".snapshot". All previous versions of the current file system volume may be listed in it. The same snapshots can be accessed as clones in a hidden ".clone" directory. The use of these hidden directories avoid having to create a mount point for each snapshot or clone.

Because the file system tree in a file system volume is a B-Tree, the snapshot or clone is naturally supported by COW B-Tree. The time needed to create a snapshot or clone is O(1), because the updating of reference counts to files or directories is deferred. When a snapshot or clone is updated at a later time, O(log n) time is needed to populate reference counts when data are first updated.

As noted above, in accordance with the present disclosure, the metadata of a VDFS volume is managed by a single vdfsd executing in single host; e.g., 402a, FIG. 4. However, in order to not let the vdfsd become a performance bottleneck, the VDFS client may directly access the data blocks of a file to read from or write to.

Figure 8:
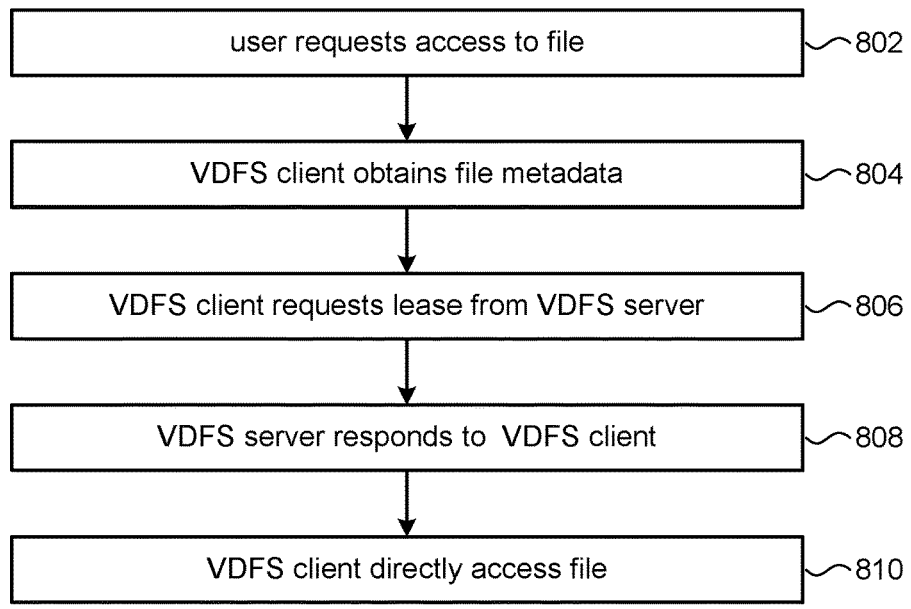
FIG. 8 illustrates a process flow to lease access to storage in accordance with the present disclosure.

FIG. 8 illustrates an example of file access processing in accordance with the present disclosure. File access may include a user reading file data from a given file, a user adding file data to a given file, a user modifying file data in a given file, and so on. At block 802, a user may request access to a file. Referring to FIG. 4, for example, the user request may be forwarded from the 9P client to the 9P server, and then to the VDFS client.

At block 804, the VDFS client may access the VDFS server (e.g., a vdfsd executing in host 402a) to obtain metadata information about the file, including the block addresses of the data blocks of the file that contain the file data of interest.

At block 806, the VDFS client (as lessor) may request a time-limited client lease from the vdfsd (as lessee) to be granted access to a portion of the VDFS. In some embodiments, the client lease may grant the VDFS client exclusive access to a portion of the file of interest, for example, expressed as a byte range in the file.

At block 808, the vdfsd may acknowledge granting of the client lease to the VDFS client. In some embodiments, the duration of the client lease may be a system parameter; every lease, for example, may be valid for X amount of time. In other embodiments, the vdfsd may respond to the VDFS client with a lease that specifies a duration of time, thus giving flexibility to allocate different lease durations to different users.

Once the byte range is leased, then the VDFS client at block 810 can perform read/write operations directly to the leased data blocks of the file without further interaction with the vdfsd. In some embodiments, the POSIX byte range locking mechanism can also be implemented by client lease. Once a range is leased by the VDFS client, the vdfsd can remember the client lease information in memory. If vdfsd crashes and reboots, it can wait long enough to let all possible leases expire before it accepts new client lease requests.

Figure 9:
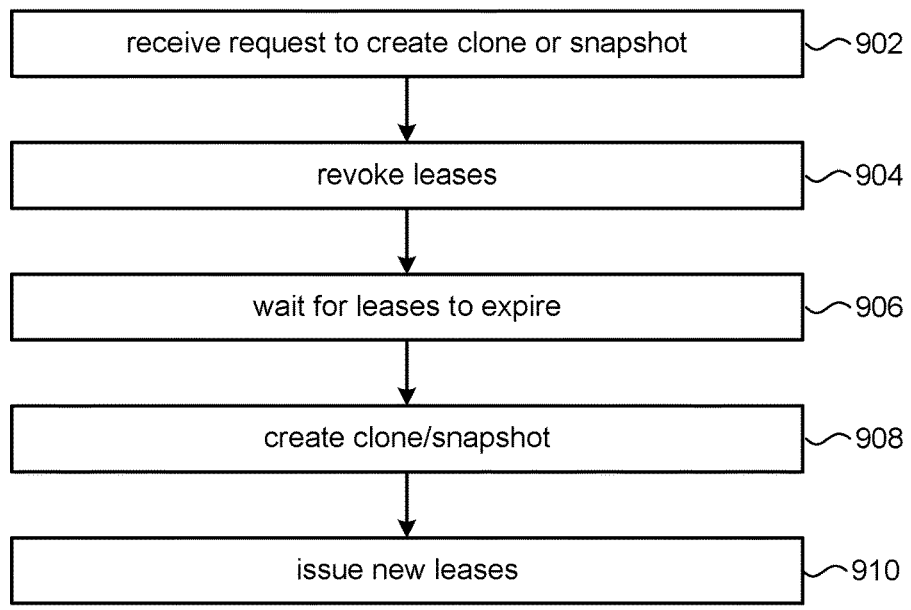
FIG. 9 illustrates a process flow to clone or take a snapshot in accordance with the present disclosure.

Referring to FIG. 9, in accordance with the present disclosure, the client lease can also be used to implement consistent distributed snapshots and clones. At block 902, the VDFS server that manages the MCS (e.g., 44a, FIG. 4) of a given file system volume may receive a request to create a clone or a snapshot of the given file system volume.

At block 904, the VDFS server may call back to all VDFS clients that are holding a lease for a portion of the given file system volume to end their lease (revocation). At block 906, if some VDFS clients cannot be reached to terminate the lease, the VDFS server can simply wait to let the lease expire. A VDFS client may be non-responsive, for example, if it crashed.

At block 908, when all the leases issued for the given file system volume have been determined to have successfully been revoked or expired, the VDFS server may modify the metadata in the MCS to create a clone. For example, the COW B-tree for the given file system volume may be cloned as described above.

At block 910, when VDFS clients request leases subsequent to creating the clone, the VDFS server may notify them to start doing copy-on-write on new writes. This guarantees the content of the snapshot or clone is consistent even when multiple clients are writing to it concurrently.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Figure 10:
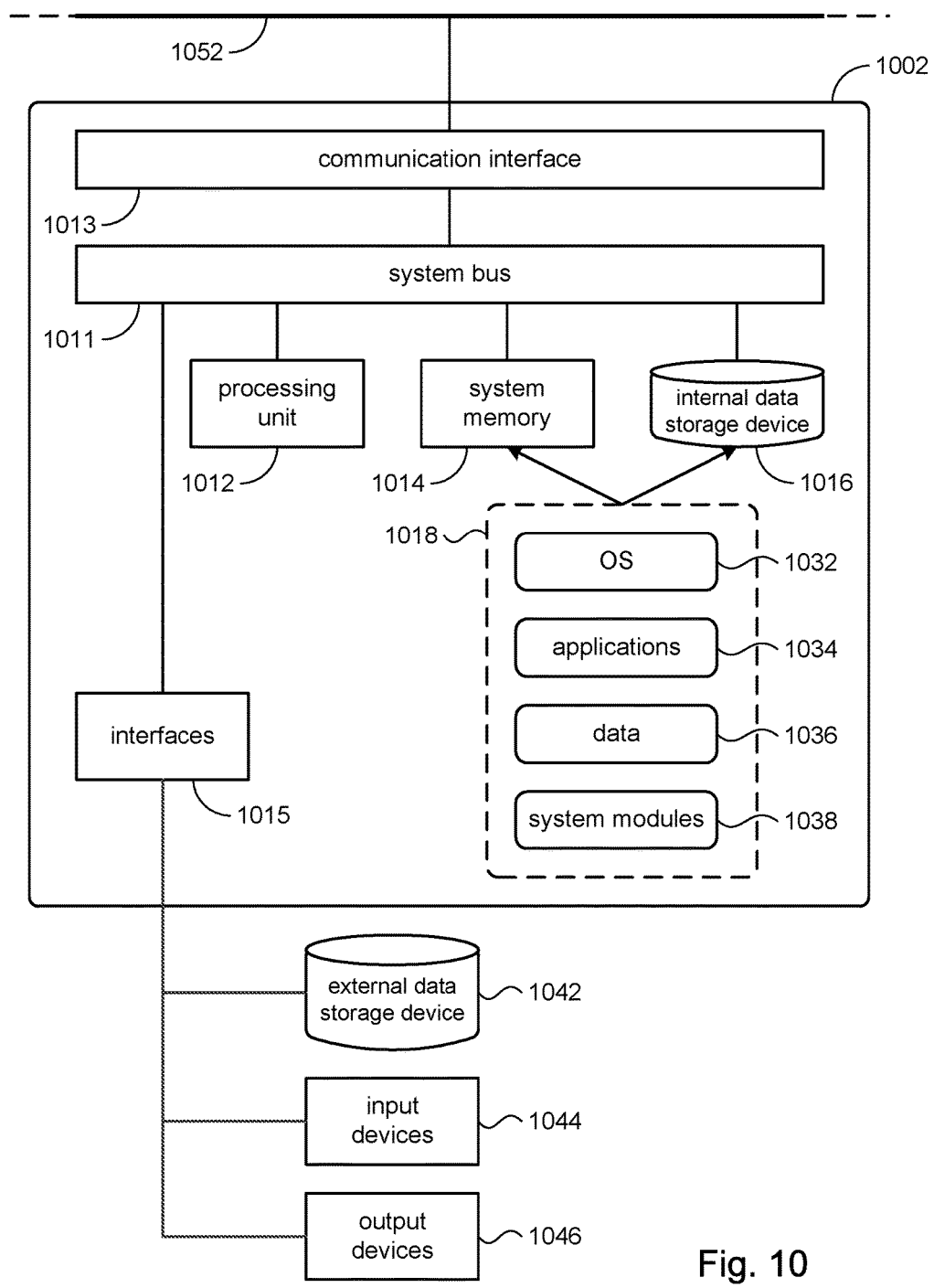
FIG. 10 illustrates an example of a computer in accordance with the present disclosure.

Referring to FIG. 10, for example, an illustrative implementation of a host computer (e.g. 12a, FIG. 1, 402a, FIG. 4) may include a computer system 1002 having a processing unit 1012, a system memory 1014, and a system bus 1011. The system bus 1011 may connect various system components including, but not limited to, the processing unit 1012, the system memory 1014, an internal data storage device 1016, and a communication interface 1013. In a configuration where the computer system 1002 is a mobile device (e.g., smartphone, computer tablet), the internal data storage 1016 may or may not be included.

The processing unit 1012 may comprise a single-processor configuration, or may be a multi-processor architecture. The system memory 1014 may include read-only memory (ROM) and random access memory (RAM). The internal data storage device 1016 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on). In a configuration where the computer system 1002 is a mobile device, the internal data storage 1016 may be a flash drive.

The internal data storage device 1016 and its associated non-transitory computer-readable storage media provide nonvolatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 1014 and/or the internal data storage device 1016 may store a number of program modules, including an operating system 1032, one or more application programs 1034, program data 1036, and other program/system modules 1038. For example, in a computer system 1002 (e.g., 402a) configured to manage the MCS 44a (FIG. 4), the application programs 1034, which when executed, may cause the computer system 1002 to perform method steps of FIGS. 8 and 9.

An external data storage device 1042 may be connected to the computer system 1002. For example, in a computer system 1002 configured as the media server 202, the external data storage device 1042 may be the data store 212b of pre-recorded media streams 102b. In a computer system 1002 configured as the AR portal 204, the external data storage device 1042 may be the objects data store 214.

Access to the computer system 1002 may be provided by a suitable input device 1044 (e.g., keyboard, mouse, touch pad, etc.) and a suitable output device 1046, (e.g., display screen). In a configuration where the computer system 1002 is a mobile device, input and output may be provided by a touch sensitive display.

The computer system 1002 may operate in a networked environment using logical connections via wired and/or wireless communications to one or more remote computers (not shown) over a communication network 1052. The communication network 1052 may be a local area network (LAN) and/or larger networks, such as a wide area network (WAN).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise.

Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a file system comprising:
    storing first data representative of content of files in a file system volume among a plurality of storage nodes of a distributed storage system;
    storing second data representative of attributes of the files in the files system volume in only one storage node in the plurality of storage nodes;
    managing time-limited leases that allow clients direct access to the plurality of storage nodes in order to access portions of the file system volume, including providing a time-limited lease to a client (client lessor), the client lessor permitted to directly access one or more of the plurality of storage nodes so long as the client lessor's time-limited lease has not expired;
    generating a snapshot or a clone of the file system volume, including sending revocations to all clients which are holding a lease for the file system volume, to revoke each client's time-limited lease; and
    sending a notification to the client lessor to start copy-on-write processing for new write operations on the file system volume in response to receiving from the client lessor a new request for a lease.

2. The method of claim 1, wherein storing the second data and managing the time-limited leases are performed in a single server.

3. The method of claim 2, wherein storing the second data and managing the time-limited leases are performed by a single process executing on the single server.

4. The method of claim 1, wherein the second data comprise namespace metadata of the file system volume and files in the file system volume.

5. The method of claim 1, wherein the file system comprises a plurality of file system volumes, the second data representative of properties of all files that comprise only one of the plurality of file system volumes in the file system.

6. The method of claim 5, further comprising storing third data representative of properties of all files that comprise another one of the plurality of file system volumes in the file system in only one storage node in the plurality of storage nodes.

7. The method of claim 6, further comprising storing the second data and third data in the same storage node.

8. The method of claim 6, further comprising storing the second data and the third data in different storage nodes.

9. The method of claim 1, wherein each time-limited lease is associated with a portion of the file system volume, a given client lessor permitted to access only a portion of the file system volume that is associated with the client lessor's time-limited lease.

10. The method of claim 1, wherein the file system comprises a plurality of file system volumes and the snapshot is a snapshot of portions of the file system that comprises a given file system volume, wherein generating the snapshot includes sending the revocation to only to those client lessors that have time-limited leases for portions of the file system that comprise the given file system volume.

11. The method of claim 1, further comprising waiting for time-limited leases of client lessors that do not acknowledge the revocation to expire before generating the snapshot.

12. A non-transitory computer-readable storage medium containing computer-executable instructions for controlling a computer system comprising a plurality of host computers to:
    store first data representative of content of files in a file system volume among a plurality of storage nodes of a distributed storage system;
    store second data representative of attributes of the files in the files system volume in only one storage node in the plurality of storage nodes;
    manage time-limited leases that allow clients direct access to the plurality of storage nodes in order to access portions of the file system volume, including providing a time-limited lease to a client (client lessor), the client lessor permitted to directly access one or more of the plurality of storage nodes so long as the client lessor's time-limited lease has not expired;
    generate a snapshot or a clone of the file system volume, including sending revocations to all clients which are holding a lease for the file system volume, to revoke each client's time-limited lease; and
    send a notification to the client lessor to start copy-on-write processing for new write operations on the file system volume in response to receiving from the client lessor a new request for a lease.

13. The non-transitory computer-readable storage medium of claim 12, further comprising executing a portion of the computer-executable instructions in only one of the computer hosts to store the second data and manage the time-limited leases in the one computer host.

14. The non-transitory computer-readable storage medium of claim 12, wherein the second data comprise namespace metadata of the file system volume and the files in the file system volume.

15. The non-transitory computer-readable storage medium of claim 12, further comprising a plurality of file system volumes, the second data representative of properties of all files that comprise only one of the plurality of file system volumes.

16. The non-transitory computer-readable storage medium of claim 15, wherein the computer-executable instructions further control the computer system to store third data representative of properties of all files that comprise another one of the plurality of file system volumes in only one storage node in the plurality of storage nodes.

17. The non-transitory computer-readable storage medium of claim 12, wherein the computer-executable instructions further control the computer system wait for time-limited leases of client lessors that do not acknowledge the revocation to expire before generating the snapshot.

18. A system comprising:
    a plurality of host computers;
    a distributed storage system; and
    computer-readable storage media comprising instructions for controlling various host computers in the plurality of host computers to:
        store first data representative of content of files in a file system volume among a plurality of storage nodes of a distributed storage system;

store second data representative of attributes of the files in the files system volume in only one storage node in the plurality of storage nodes;

manage time-limited leases that allow clients direct access to the plurality of storage nodes in order to access portions of the file system volume, including providing a time-limited lease to a client (client lessor), the client lessor permitted to directly access one or more of the plurality of storage nodes so long as the client lessor's time-limited lease has not expired;

generate a snapshot or a clone of the file system volume, including sending revocations to all clients which are holding a lease for the file system volume, to revoke each client's time-limited lease; and send a notification to the client lessor to start copy-on-write processing for new write operations on the file system volume in response to receiving from the client lessor a new request for a lease.

19. The system of claim 18, wherein only one host computer in the plurality of host computers is configured to store the second data and manage the time-limited leases.

20. The system of claim 18, further comprising a plurality of file system volumes, the second data representative of properties of all files that comprise only one of the plurality of file system volumes.

* * * * *